May 12, 1964 D. W. SEYMOUR 3,132,969

APPARATUS FOR ELECTROSTATIC PRINTING AND TRANSFERRING PRINTED INFORMATION

Filed Oct. 27, 1961

INVENTOR.
DAVID W. SEYMOUR

BY Samuel Kane

ATTORNEY

United States Patent Office 3,132,969
Patented May 12, 1964

3,132,969

APPARATUS FOR ELECTROSTATIC PRINTING AND TRANSFERRING PRINTED INFORMATION

David W. Seymour, King of Prussia, Pa., assignor to Burroughs Corporation, Detroit, Mich., a corporation of Michigan Filed Oct. 27, 1961, Ser. No. 148,185
3 Claims. (Cl. 118—637)

This invention relates generally to electrostatic recording and more particularly to apparatus for printing electrostatically on one record medium and transferring the printed information to another record medium.

In the electrostatic printing art, it has been customary to print on a special type of record medium composed of a dielectric material bonded to an electrically conductive paper backing. This type of record medium has been relatively expensive.

An important object of the invention, therefore, is to minimize the cost of electrostatic recording by providing an apparatus for and method of recording which will combine the high speed characteristics of electrostatic recording with the economy of using ordinary paper or card stock as a record medium.

Another object of the invention is to provide a recording apparatus which may be operated selectively for printing new or different information or for printing duplicate records of the same information.

In accordance with the above objects, the first considered briefly in its broad aspects, the invention comprises apparatus for, and methods of, obtaining a master record of electrostatically recorded information, inking the master record medium to render the electrostatic image visible, conditioning the inked image to make it transferable, and transferring the inked image to another record medium. Transfer of the inked image is accomplished without removing a significant amount, if any, of the corresponding electrostatic charges from the master record medium so that the master record medium may be used repeatedly for producing duplicate copies of the recorded information. Alternatively, the master record medium may be electrically neutralized after each transfer of printing if it is desired to print new or different information for transfer to the other record medium.

The invention will be more clearly understood when the following detailed description of the preferred embodiment thereof is read in conjunction with the accompanying drawings in which.

Figure 1:
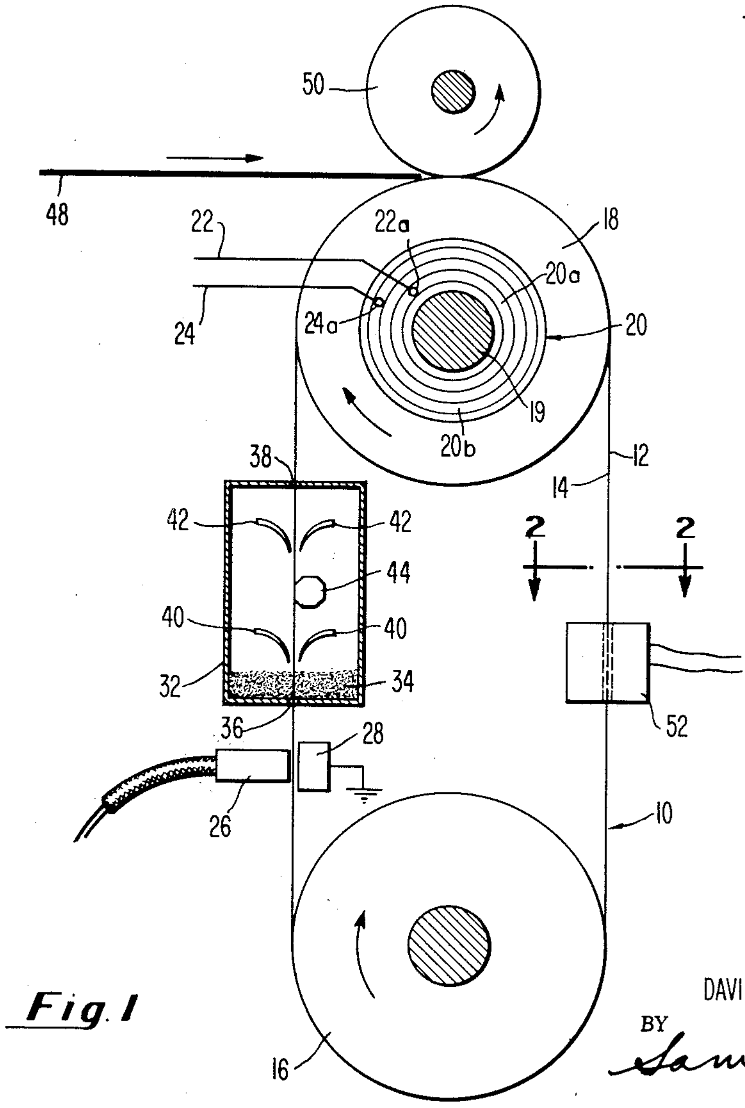
FIG. 1 is a diagrammatic illustration of an apparatus embodying principles of the invention.
Figure 2:
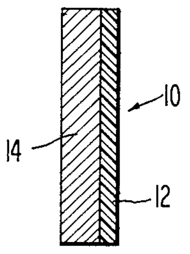
FIG. 2 is an enlarged sectional view of the master record medium taken along iline 2—2 of FIG. 1.

Turning now to the drawings, and first considering the apparatus aspects of the invention, the illustrated embodiment comprises a heat conductive master record sheet or strip, preferably in the form of an endless band 10 (FIG. 1), which is fabricated of an outer layer or dielectric surface 12 and an inner backing layer 14 of electrically conductive material, preferably of steel construction. The endless band 10 is mounted on an idler roller 16 and a heat conductive drive roller 18 secured on a shaft 19 which is rotatable from a suitable source of power, not shown. The drive roller 18 is provided with an electrical heating element 20 which may be connected to a source of electrical energy by means of lead wires 22 and 24 having terminal brushes 22*a* and 24*a* which ride against circular contacts 20*a* and 20*b* of the heating element 20.

Figure 3:
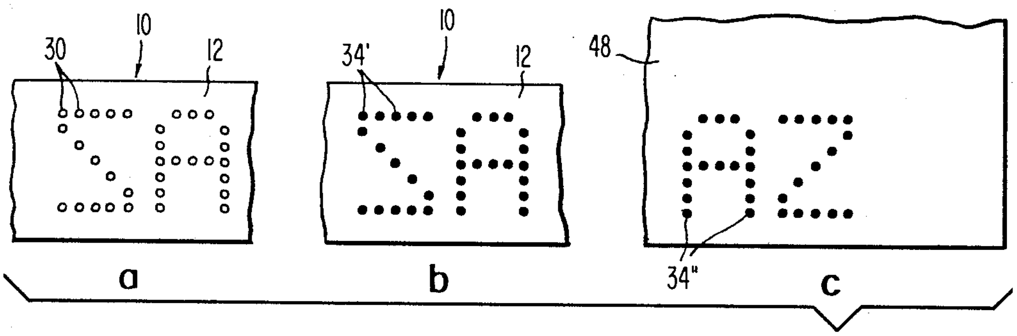
FIG. 3 illustrates successive steps in the process of printing and inking the master record medium and of transferring the inked imaged from the master record medium to another record medium.

The endless band 10 is arranged to receive electrostatic printing on the dielectric surface 12 by passing between a print head 26 and a back electrode 28. A print head 26 may, for example, be of the kind shown in U.S. Patent No. 2,955,894, in which case it would contain a matrix of pin electrodes, not shown, each pin electrode adapted to be energized for printing or impressing a latent electrostatic charge 30 (FIG. 3*a*), on the dielectric surface 12 in accordance with predetermined patterns. For purposes of illustration, the patterns of charges 30 shown in FIG. 3*a* are formed for recording letters "A" and "Z," with each charge 30, while actually invisible, being shown as a visible circular region.

The band 10 passes through a container 32 which is provided with a supply of finely divided, thermoplastic and thermoadhesive, electrically conductive pigmented ink 34 in powder form. The band 10 passes through openings 36 and 38 in the container 32 between internal baffles 40 and 42, and along the side of an internal rotatable octagonal beater 44.

In the method aspects of the invention, the electrical heating element 20 is suitably heated, and controlled in temperature by any suitable device such as a thermostat, not shown. Roller 18 is rotated, by drive shaft 19, to advance the master record or endless band 10 past the print head 26, where it receives electrostatic printing in the form of the charges 30, and thence through the container 32 to attract particles of ink 34 to the charges 30 to make the latent electrostatic image visible, as depicted in FIG. 3*b*. The darkened spots, or regions 34', indicate the adhesion of ink particles 34 to the latent electrostatic charges 30.

As the endless band 10 moves upwardly through the container 32, any attempt of excess ink particles 34 to rise in a cloud and adhere mechanically to the uncharged regions of the band will be resisted by the baffles 40. If any ink particles 34 should get by the baffles 40 and adhere mechanically to the uncharged regions of the band 10, they will be shaken from these surfaces by the intermittent striking of the rotating beater 44 against the backing 14. Any further attempt of ink particles 34 to get on the uncharged surfaces of the band 10 past the beater 44 will be resisted by the baffles 42.

When the endless band 10 has been rotated to a position where its portion carrying the inked image (FIG. 3*b*) is on the heated roller 18, the ink particles adhering to the electrostatic charges will absorb heat and become plastic and adhesive. Thus when a record medium 48 is fed through the bite of the drive roller 18 and a cooperating pressure roller 50, the plastic adhesive ink particles 34'' (FIG. 3*c*) will adhere to the record medium 48, and will thereby be pulled off the dielectric surface 12 without the removal therefrom of any significant portion of electrostatic charges 30. It has been found that the heated adhesive ink transfers best from the dielectric surface 12 to the record medium 48 when the dielectric surface is extremely smooth and when it has a lower coefficient of friction with respect to the plastic adhesive ink than the record medium.

Satisfactory results have been obtained by using a dielectric surface 12 formed of a fluorocarbon resin. One such resin is manufactured by Acheson Colloids Incorporated under the name "Emeralon 310." Other known fluorocarbon resins which are also satisfactory are manufactured by E. I. du Pont de Nemours and designated by that company as "Teflon," brands "TFE" and "FER," respectively.

An electrically conductive thermoplastic ink which is thermoadhesive and satisfactory for use with the present invention is described and claimed in a copending application of Charles P. West and Jacques Benveniste, Serial No. 676,716, filed August 7, 1957, entitled "Electrographic Printing Ink" and assigned to the same assignee as the present invention.

From the foregoing description, it is clear that duplicate records on media 48 may be obtained by repeatedly rotating the electrostatically charged master record or endless band 10. If it is desired to record new or different information on a record medium 48, an erase head 52 may be actuated to remove the electrostatic charges 30 from the dielectric surface 12, or to otherwise electrically neutralize these charges to condition the dielectric surface for receiving new printing from the print head 26.

What is claimed is:

1. Apparatus for printing electrostatically and transferring the printed information to a record medium comprising:

(*a*) an endless heat conductive band of charge retentive material constituting a dielectric surface, (*b*) rollers mounting said endless band and operable to rotate the band in a path of operation, (*c*) an electrostatic printing device for printing in a single operation on said endless band an electrostatic charge pattern representative of information, (*d*) means for applying electrically conductive thermo-adhesive ink particles to said electrostatically charged pattern, (*e*) means for heating one of said rollers effective as a sole heating element for rendering adhesive the ink particles on said electrostatically charged pattern, (*f*) a pressure roller cooperable with said heated roller for feeding a record medium into contact with said adhesive inked pattern for transferring the inked pattern to said record medium, and (*g*) means for electrically neutralizing the electrostatically charged regions of said endless band after the transfer of said inked pattern.

2. Apparatus according to claim 1 characterized further in that said endless band is provided with an inner backing layer of electrically conductive material.

3. Apparatus according to claim 1 characterized further in that said heating device is carried and rotated by the heated roller and include circular contacts for connection to a source of electrical energy.

References Cited in the file of this patent

UNITED STATES PATENTS

| | | |
|---|---|---|
| 2,777,745 | McNaney | Jan. 15, 1957 |
| 2,919,672 | Benn et al. | Jan. 5, 1960 |
| 2,955,894 | Epstein | Oct. 11, 1960 |
| 2,990,278 | Carlson | June 27, 1961 |
| 3,013,878 | Dessauer | Dec. 19, 1961 |